(12) United States Patent
Wanders et al.

(10) Patent No.: US 12,416,550 B2
(45) Date of Patent: Sep. 16, 2025

(54) SAMPLING SYSTEM

(71) Applicant: Beckman Coulter, Inc., Brea, CA (US)

(72) Inventors: Bart Wanders, Trabuco Canyon, CA (US); Eric Grace, Deland, FL (US)

(73) Assignee: Beckman Coulter, Inc., Brea, CA (US)

( * ) Notice: Subject to any disclaimer, the term of this patent is extended or adjusted under 35 U.S.C. 154(b) by 347 days.

(21) Appl. No.: 18/109,604

(22) Filed: Feb. 14, 2023

(65) Prior Publication Data

US 2023/0258540 A1    Aug. 17, 2023

Related U.S. Application Data

(60) Provisional application No. 63/309,887, filed on Feb. 14, 2022.

(51) Int. Cl.
*G01N 35/10* (2006.01)
*G01N 1/14* (2006.01)

(52) U.S. Cl.
CPC ....... *G01N 1/14* (2013.01); *G01N 2001/1418* (2013.01)

(58) Field of Classification Search
CPC ............. G01N 1/14; G01N 2001/1418; G01N 35/1083; G01N 2035/0406; G01N 35/04; G01N 2001/1427; G01N 35/109; G01N 2035/0401

USPC ....... 436/180; 422/63, 509; 73/53.01, 61.55, 73/61.59, 64.56, 863, 863.01, 864.24, 73/864.25

See application file for complete search history.

(56) References Cited

U.S. PATENT DOCUMENTS 3,687,632 A * 8/1972 Natelson ............ G01N 35/1083
422/510

FOREIGN PATENT DOCUMENTS

| EP | 1275966 A1 * | 1/2003 | .............. B01L 9/543 |
| WO | WO-2013174961 A2 * | 11/2013 | .............. B01F 29/31 |
| WO | WO-2018038019 A1 * | 3/2018 | ................ B01J 4/02 |
| WO | WO-2018173464 A1 * | 9/2018 | .............. B01L 3/523 |

* cited by examiner

*Primary Examiner* — Robert R Raevis
(74) *Attorney, Agent, or Firm* — Frost Brown Todd LLP

(57) ABSTRACT

A sampling system that includes a traverse, a sample aspiration module body, and a mechanical system. The sample aspiration module body is configured to travel along the traverse. The mechanical system is configured to move the traverse from a first position to a second position, wherein both the first position and the second position lie in the same plane.

20 Claims, 16 Drawing Sheets

SAMPLING SYSTEM

CROSS REFERENCE TO RELATED APPLICATIONS

This is a non-provisional of, and claims the benefit of, provisional patent application 63/309,887, titled "Sampling System" and filed in the USPTO on Feb. 14, 2022, the disclosure of which is hereby incorporated by reference in its entirety.

FIELD OF THE DISCLOSURE

Embodiments of the present disclosure relate generally to a system that provides specimen tube analysis. Specific embodiments provide transportation of specimen tubes for presentation, mixing, sampling, and/or analysis in various preparation chambers along a single plane.

BACKGROUND

Some systems provide specimen tube analysis and movement through an analysis system that generally moves specimen tubes along multiple planes or axes in order to accommodate necessary functions. Although these systems are functional, the need for motion and multiple axes adds to the complexity and cost of the mechanism required. The use of multiple axes can also reduce reliability, leading to potentially increased downtime for repairs.

BRIEF SUMMARY

Accordingly, this disclosure relates to a system that provides specimen tube analysis using only a single plane of motion. It reduces the overall complexity and cost of system, while also increasing reliability. Embodiments of the present disclosure provide a sampling system with components that move along a single plane. In some embodiments, the components of a sampling system are contained in a vertical orientation in order to have the components along a single plane.

In some embodiments, a sampling system includes a traverse which supports a sample aspiration module body and an aspiration probe, a cassette holding one or more specimen tubes, and one or more preparation chambers for sample analysis whereby the module body and aspiration probe are configured to deposit the contents of the specimen tubes into the preparation chambers. In some embodiments, these elements are contained within a single plane or located along a single axis. In some examples, these elements are horizontally and/or vertically offset from each other but still contained within a single plane or along a single axis.

In one embodiment, a traverse used as part of a sampling system has two degrees of movement (e.g., horizontal and vertical) but these are linked movements and the traverse is limited to movement along a single plane or single axis. In some embodiments, the traverse is movable and in some embodiments the traverse is fixed. In some examples, the traverse is connected to one or more cams or linked to an angled track mechanism.

In some embodiments, a sampling system utilizes an angled traverse and a sample aspiration module mounted to the angled traverse, where various components of the sampling system and vertically offset from each other. In one example, the vertical offset comprises a staggered configuration.

In some embodiments, a sampling system utilizes a traverse, a sample aspiration module body configured to travel along the traverse, and one or more specimen tubes and one or more preparation chambers where the one or more specimen tubes and one or more preparation chambers are vertically offset along a same or similar plane.

In some embodiments, methods of operating a sampling system (such as the sampling system embodiments described above) are contemplated. In some embodiments, a method comprises moving a traverse along a plane and moving a sample aspiration module body linked to the traverse. In some embodiments, a method comprises moving a sample aspiration module body along an angled traverse to access different regions of a sampling system (e.g., a specimen tube, and preparation chambers). In some embodiments, a method comprises utilizing a sample aspiration module body to take a sample from a specimen tube, moving the sample aspiration module body along a traverse to deposit the sample into a preparation chamber, wherein the specimen tube and the preparation chamber are vertically offset along a same or similar plane.

DETAILED DESCRIPTION

Figure 1A:
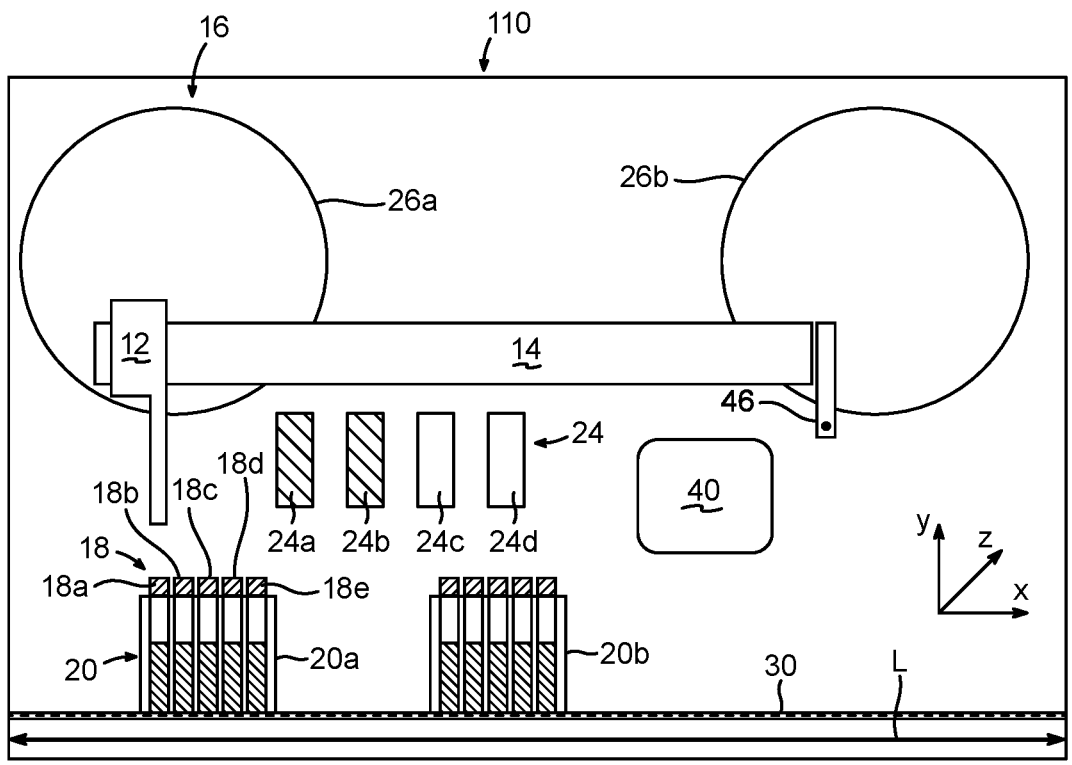
FIG. 1A shows a schematic front plan view of an exemplary sampling system that moves in a single plane.

Existing sampling systems utilize complicated multi-planar movements where different components of the system must be able to navigate in various directions along different axes and different planes in order to obtain a sample. This results in complexity, increased risk of mechanical failure, and also can occupy significant space creating a resource burden. Such existing systems are described, for instance, in U.S. Pat. Nos. 7,331,474, 7,028,831, 7,850,914, the disclosure of each of the above-cited U.S. Patents is incorporated by reference herein in its entirety.

For the purposes of the Figures, FIGS. 1A-1J, 4A-6D generally show a frontal plan view of the various systems described herein. As such, there is an x-axial direction extending horizontally (e.g., left to right), a y-axial direction extending vertically (e.g., up and down), and a z-axial direction extending into the page (e.g., depth wise) which generally is not visible since the drawings generally offer a frontal, 2-dimensional view.

Embodiments of the present disclosure provide exemplary sampling systems 10, 210 that include an aspirator module body 12 that moves along a traverse 14, 50. The sampling systems 10, 210 moves the sample aspiration module body 12 in only a single plane.

The sampling system 10 includes a sample aspiration module body 12 that is positioned on a traverse 14, with the traverse 14 extending at least a portion of the length L within the system. The sample aspiration module body 12 may have an opening therethrough that receives the shaft of the traverse 14. Alternatively, the sample aspiration module 12 may be slidably mounted to the traverse 14. Other securement/movement/attachment possibilities between the sample aspiration module body 12 and the traverse 14 are envisioned within the scope of this disclosure. As will be described further below, the traverse 14 is raised or lowered (in the same plane) via a mechanical system 16. Raising and lowering of the traverse 14 causes raising and lowering of the sample aspiration module body 12.

A plurality of specimen tubes 18, each containing a sample, are positioned on a cassette assembly 20. The cassette assembly 20 includes individual cassettes 20a, 20b. The cassettes 20a, 20b may be moved through the sampling system 10 via a sample transport module 30. For example, the sample transport module 30 may include a conveyor belt. One or more of the cassettes 20a, 20b may be associated with a mixer 28 (see FIGS. 2-3), which functions to tilt the cassettes 20a, 20b (and their respective specimen tube(s) 18) to maintain the mixed specimen and to prevent any precipitation that may otherwise occur. When the cassette 20a is in the desired position with respect to the sample aspiration module body 12, the sample aspiration module body 12 is positioned over a specimen tube 18, as illustrated by FIG. 1A.

Figure 1B:
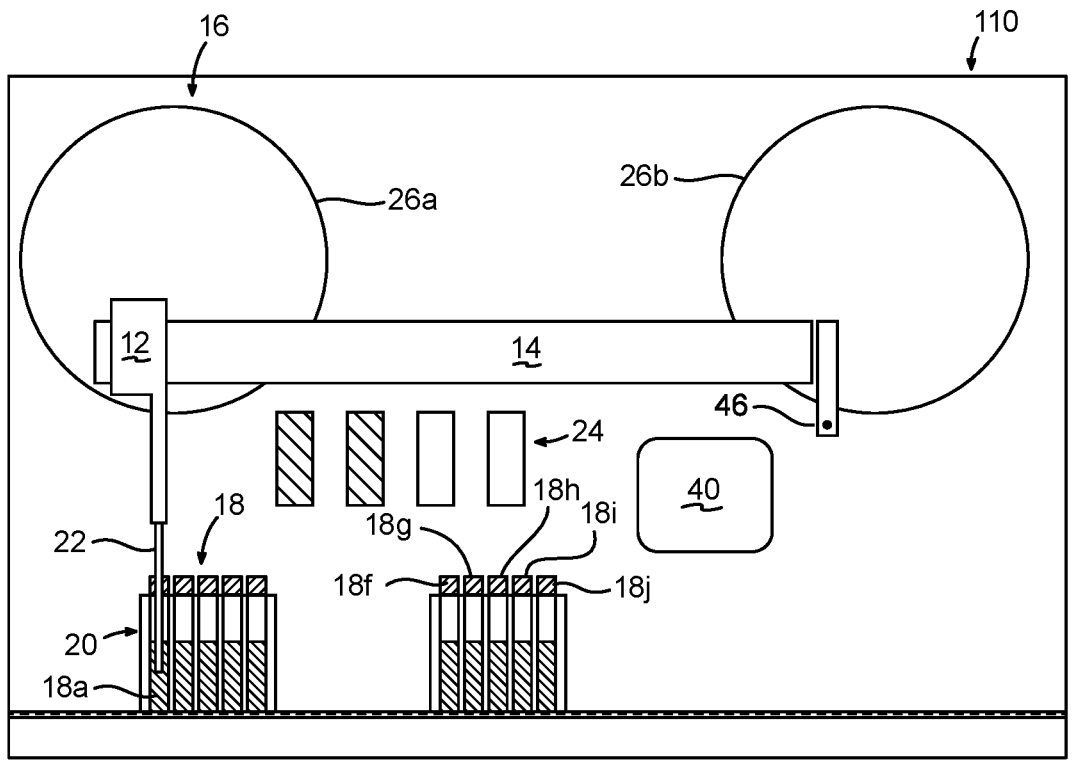
FIG. 1B shows a schematic front plan view of the sampling system of FIG. 1A, but with a sample aspiration module body positioned over a first specimen tube and a probe extending into the tube to collect a sample.
Figure 1C:
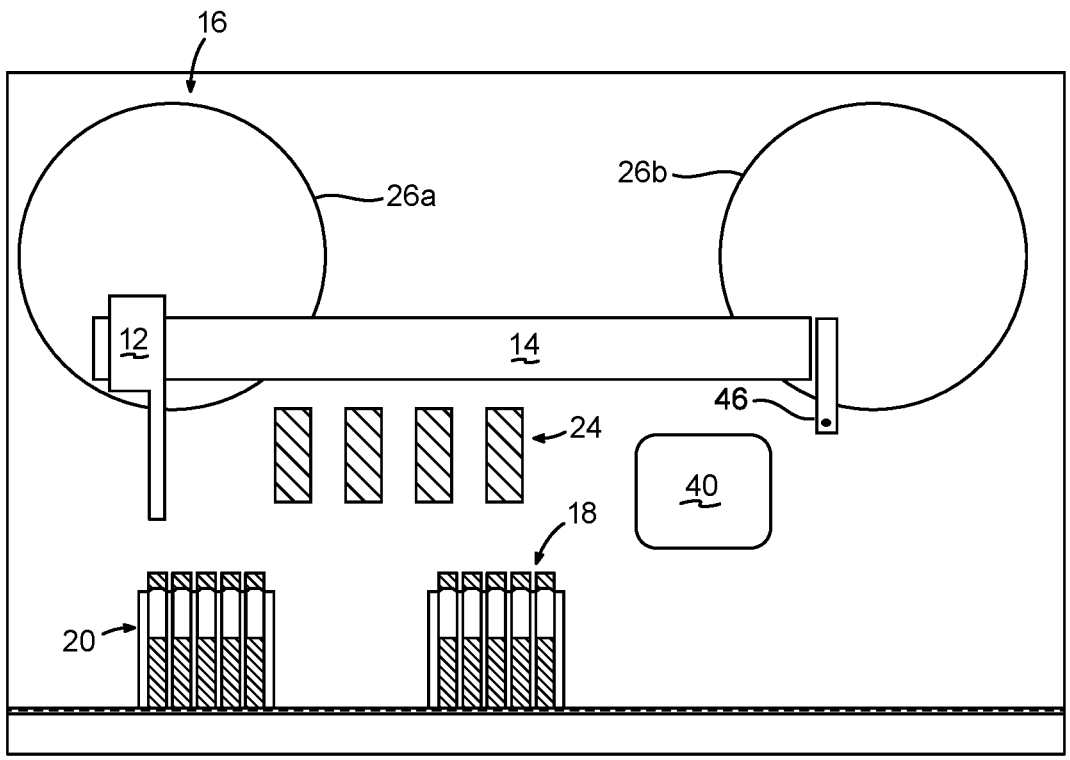
FIG. 1C shows a schematic front plan view of the sampling system of FIG. 1B, but with the probe retracted.

The sample aspiration module body 12 supports an aspirator probe 22 which is lowered relative to the sample aspiration module body 12 into a specimen tube 18a of a specimen tube arrangement 18 to aspirate a sample from the specimen tube 18. This raising and lowering movement of the aspirator probe 22 is shown as an up-and-down (i.e., vertically oriented) motion (into and out of the sample aspiration module body 12). The sample aspiration module body moves along traverse 14 (i.e., longitudinally along traverse 14) to engage the various specimen tubes 18, and then the aspirator probe 22 lowers (i.e., vertically moves down from the sample aspiration module body 12) to enter and exit each specimen tube. FIG. 1A shows the sample aspiration module body 12 in position over one of the specimen tubes 18a-18e and the cassette 20a. FIG. 1B shows the aspirator probe 22 extended from the sample aspiration module body 12 and aspirating a sample from an individual tube 18a of specimen tube arrangement 18. Note, aspirator probe 22 has a retracted configuration (e.g., FIG. 1A) where probe 22 is contained within sample aspiration module body 12 and an extended configuration (e.g., FIG. 1B) where probe 22 extends vertically from sample aspiration module body 12. In FIG. 1C, the aspirator probe 22 has retracted back into the sample aspiration module body 12. The sample aspiration module body 12 may provide a cleaning function to clean the outer portion of the aspiration probe 22 so that it does not contaminate the next vial/tube/preparation chamber into which the aspiration probe 22 is inserted.

Alternative embodiments can utilize aspiration probe 22 in a non-retractable position such that it adopts a constant elongated position relative to sample aspiration module body 12. In one example, sample aspiration module body 12 can move along a y-direction (i.e., vertically) relative to traverse 14 to enter and exit specimen tubes 18 and preparation chambers 24. In another example, aspiration probe 22 has a fixed elongated configuration and movement of traverse 14 controls the position of aspiration probe 22 relative to specimen tubes 18 and preparation chambers 24.

Figure 1D:
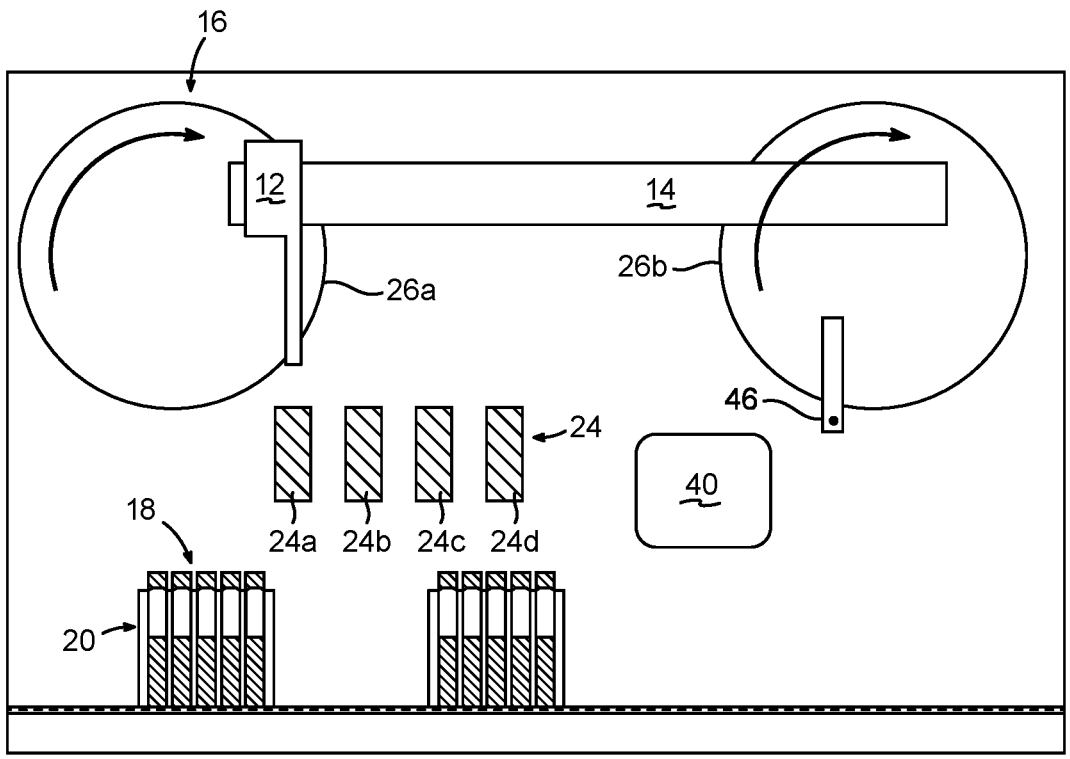
FIG. 1D shows a schematic front plan view of the sampling system of FIG. 1C, but with a mechanical system moving the traverse to an upper (second) position, such that the sample aspiration module body is positioned over a mix chamber.

Once the sample has been collected, the sample may be transported to preparation assembly 24. As shown, the preparation assembly 24 lies in the same plane (e.g., along the same z-axis location) as the cassettes 20a, 20b of cassette assembly 20. In other words, the preparation assembly 24 is positioned above and/or to the left or right of the cassette assembly 20, but not forward or back of the cassettes 20a, 20b (e.g., not displaced along a z-axis). This is different than prior art systems where a preparation assembly is inwardly displaced (meaning, displaced along a z-axis) relative to the cassettes. A mechanical system 16 moves the sample aspiration module body 12 vertically up and horizontally over to the location of the preparation assembly 24. As illustrated by FIG. 1D, the traverse 14 may be secured to the mechanical system 16 that includes cams 26a, 26b. It should be understood, however, that a single cam (or more than two cams) may be used if desired. As shown in FIGS. 1A-1J, the cams 26a, 26b may function as rollers or wheels that can rotate to one or more optional hard stops 46. The hard stops 46 (one shown) may be associated with predetermined positions of the traverse 14 relative to one or more of the specimen tubes 18a-18j of the tube arrangement 18, the preparation chambers/baths 24a-24d of the preparation assembly 24, or the sampling holder 40. As shown, the cams 26a, 26b may work collectively together to move the traverse 14 between the predetermined positions. The hard stops 46 of the cams 26a, 26b may be disposed slightly past the lowest point of the traverse 14, so that the sample aspiration module body 12 can use the hard stops to 'push off against' and generate a sufficient force to pierce the thick rubber stopper of the specimen tubes 18a-18j. In some versions, this may eliminate the need for a large strong motor to drive/position the cams 26a, 26b. As shown, the cams 26a, 26b are rotatable, such that rotation of the cams 26a, 26b causes related movement of the traverse 14.

When the traverse 14 is raised to its second position as shown by FIG. 1D, the sample aspiration module body 12 is positioned above the preparation assembly 24. The body 12 may then be moved to a position to deliver the collected sample to the preparation assembly 24. While the preparation assembly 24 is shown as including four individual chambers/baths 24a-24d, it should be understood that more or fewer preparation chambers/baths may be used, including a single preparation chamber or bath. As shown, the preparation assembly 24 may include an imaging white blood cell (WBC) chamber 24a, an imaging red blood cell (RBC) chamber 24b, a complete blood count (CBC) white blood count (WBC) bath 24c, and a CBC/RBC bath 24d.

Figure 1E:
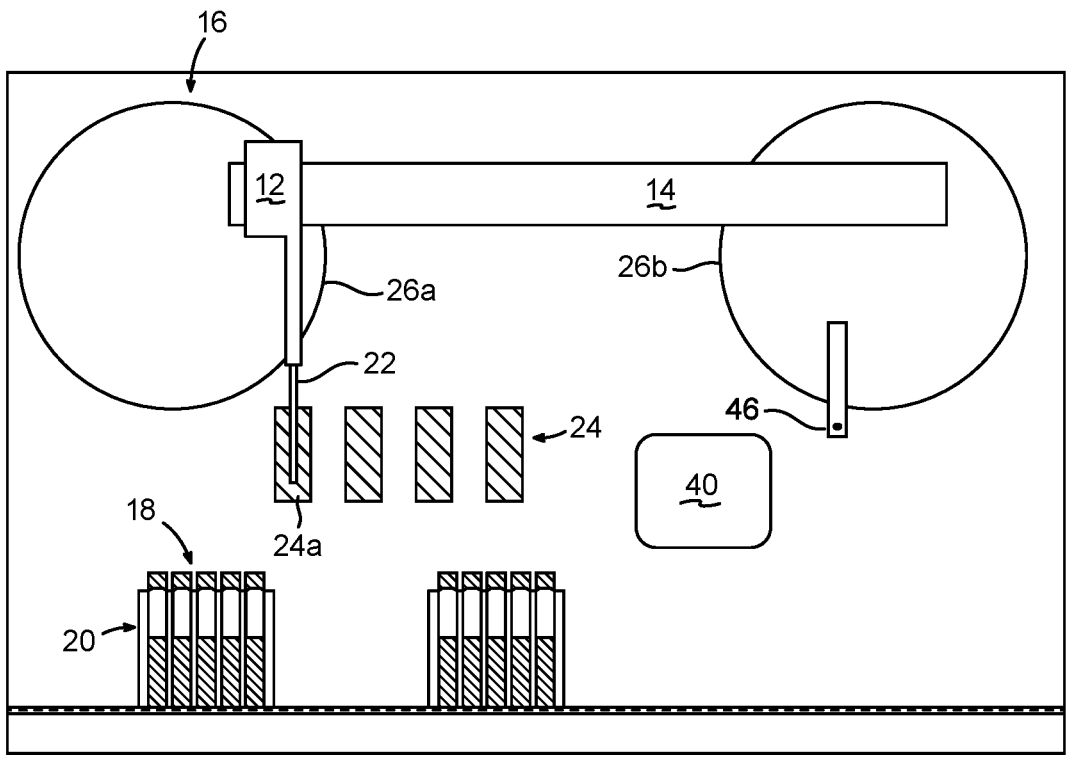
FIG. 1E shows a schematic front plan view of the sampling system of FIG. 1D, but with the sample aspiration module body positioned over a mix chamber and with the probe extending into the mix chamber to deliver the sample.
Figure 1F:
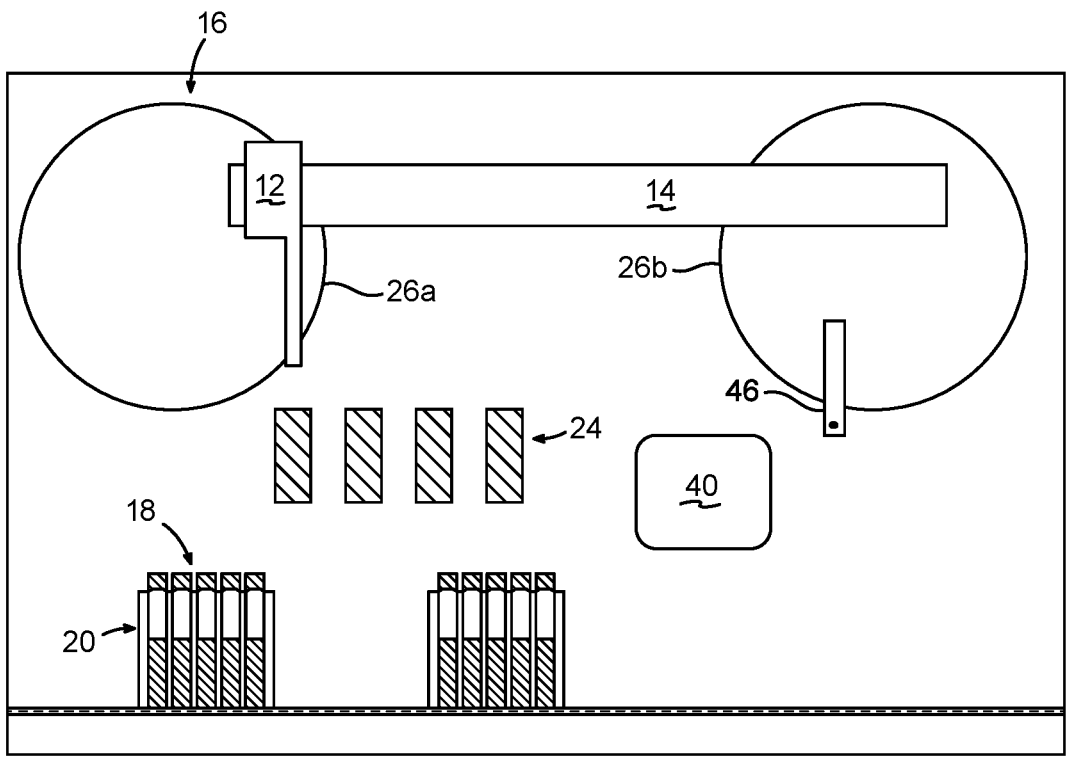
FIG. 1F shows a schematic front plan view of the sampling system of FIG. 1E, but with the probe retracted from the first mix chamber.
Figure 1G:
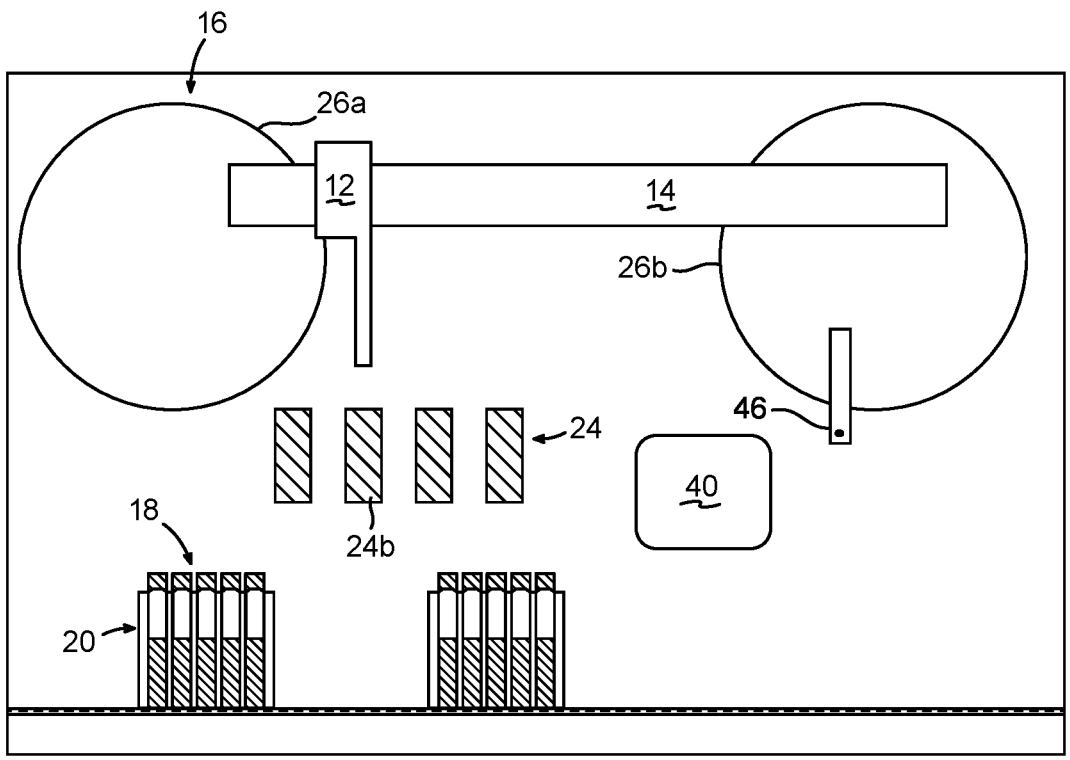
FIG. 1G shows a schematic front plan view of the sampling system of FIG. 1F, but with the sample aspiration module body positioned over a second mix chamber.
Figure 1H:
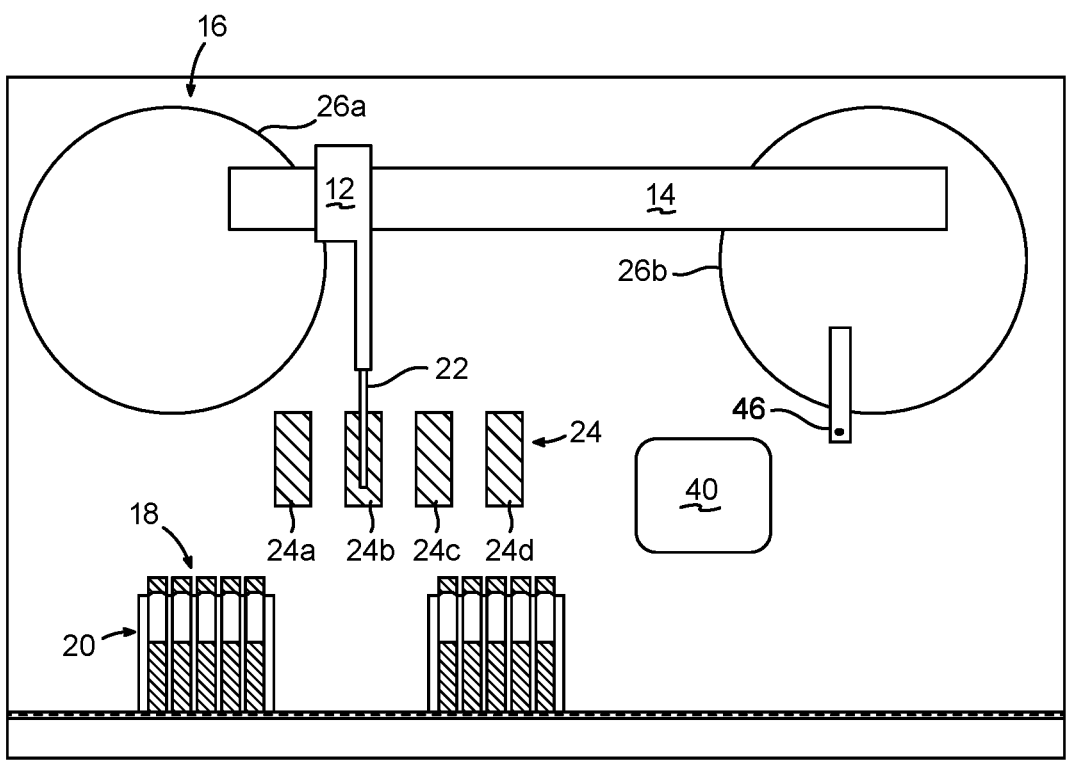
FIG. 1H shows a schematic front plan view of the sampling system of FIG. 1G, but with the probe extending into the second mix chamber to deliver the sample.
Figure 1I:
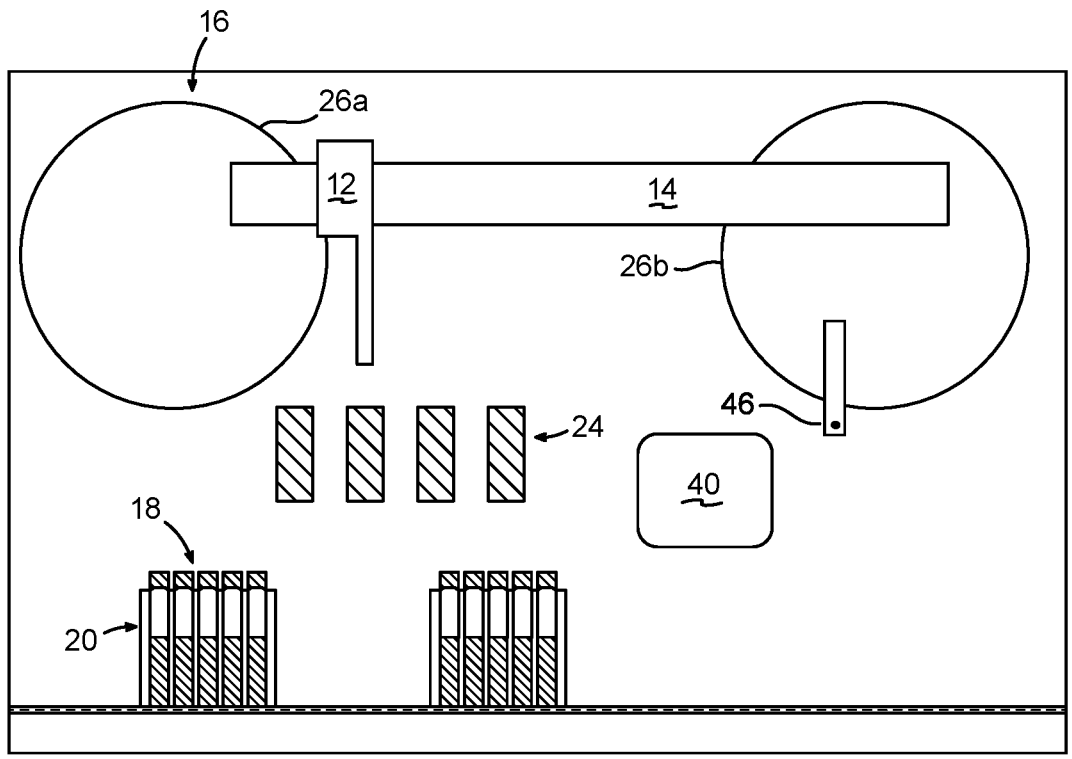
FIG. 1I shows a schematic front plan view of the sampling system of FIG. 1H, but with the probe retracted from the second mix chamber.

FIG. 1E illustrates the aspiration probe 22 being extended into the imaging WBC chamber 24a. FIG. 1F illustrates the aspiration probe 22 retracted into the sample aspiration module body 12. FIG. 1G illustrates the sample aspiration module body 12 moved laterally along the traverse 14 to chamber 24b. FIG. 1H illustrates the aspiration probe 22 being extended into the imaging RBC chamber 24b. FIG. 1I illustrates the aspiration probe 22 being retracted into the sample aspiration module body 12.

Figure 1J:
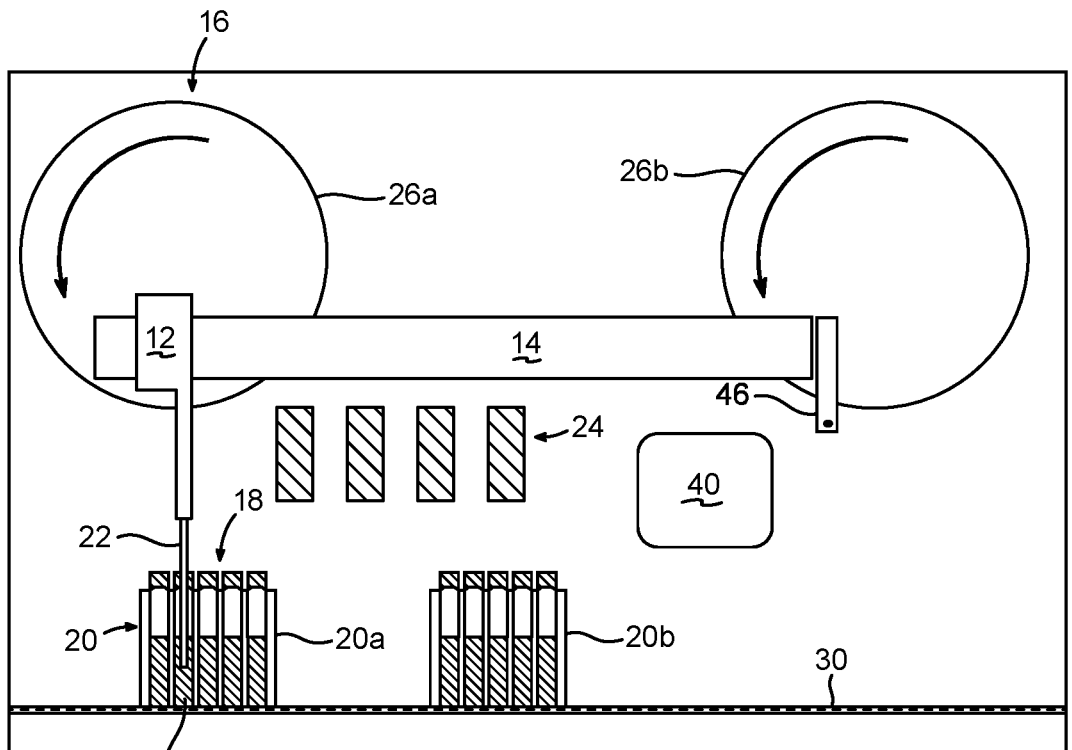
FIG. 1J shows a schematic front plan view of the sampling system of FIG. 1I, but with the mechanical system moving the traverse to a first position, such that the sample aspiration module body is positioned over a second specimen tube.

This similar movement may continue as the sample aspiration module body 12 is moved laterally along the traverse 14 to additional mixing chambers or baths of preparation assembly 24 (so in this example to baths 24c, 24d). Once the collected sample has been deposited in the chambers/baths 24a-24d, the mechanical system 16 may be reversed in rotation so that the one or more cams 26 move the traverse 14 back down to the first position. In other words, lowering of the traverse 14 positions the sample aspiration module body 12 back to its lowered position (i.e., to the position shown in FIGS. 1A-1C). The next specimen tube 18b on the cassette 20 may then be sampled. FIG. 1J illustrates the sample aspiration module body 12 in position over specimen tube 18b, as the aspiration probe 22 is prepared to collect a sample therefrom. The same process as described above, with the mechanical system 16 moving the traverse 14 back up to the level of preparation assembly 24. Once each of the desired specimen tubes 18a-18e on cassette 20a have been sampled, the sample transport module 30 may function similar to a conveyor to move the first cassette 20a along within the sampling system 10, such that the cassette 20b may be positioned beneath the sample aspiration module body 12. Thereafter, the sampling system may process the specimen tubes 18f-18j contained in the cassette 20b in a similar manner to the specimen tubes 18 of the cassette 20a.

Figure 2:
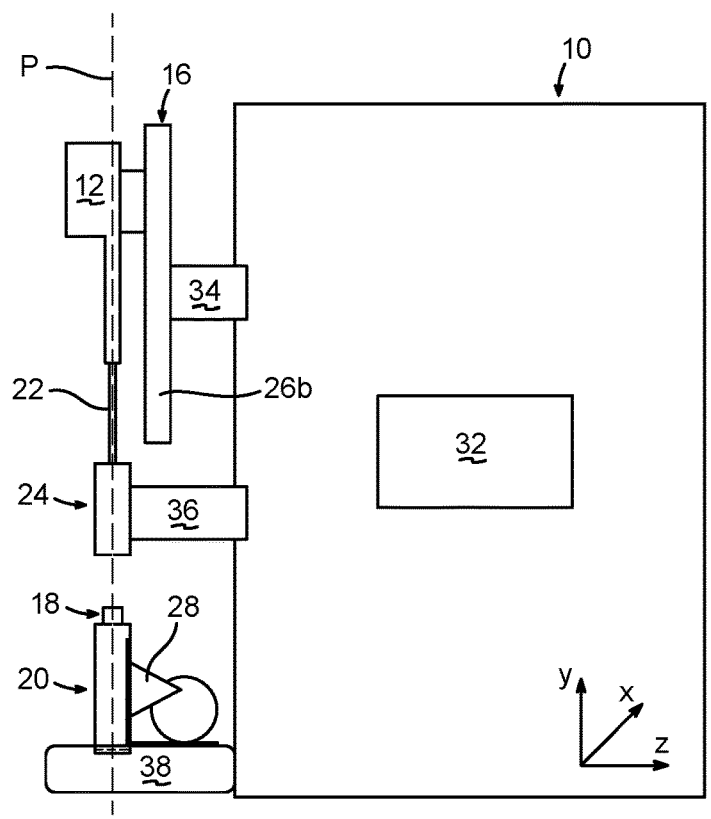
FIG. 2 shows a schematic side plan view of the sampling system of FIG. 1B.
Figure 3:
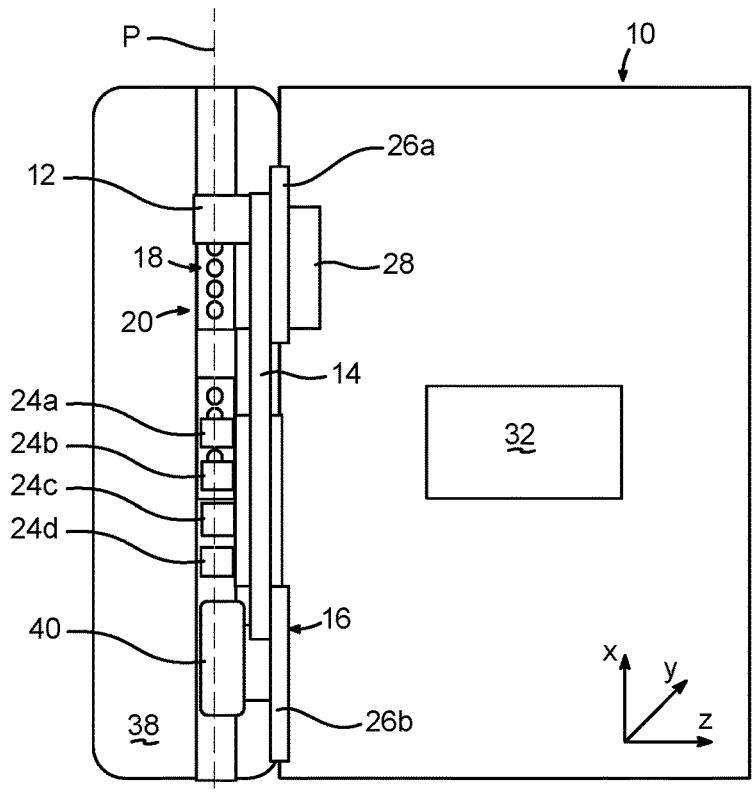
FIG. 3 shows a schematic top view of the sampling system of FIG. 1B.

FIG. 2 illustrates a side plan view of the sampling system 10, and FIG. 3 illustrates a top plan view of the sampling system 10. With respect to FIG. 2, as this is a side plan view, there is an x-axial direction extending into the page, a y-axial direction extending vertically, and a z-axial direction extending left-to-right. With respect to FIG. 3, as this is a top plan view, there is an x-axial direction extending top-to-bottom, a y-axial direction extending into the page, and a z-axial direction extending left-to-right.

As shown in FIGS. 2-3, the sample aspiration module body 12, the specimen tubes 18a-18j in the cassette assembly 20, and the preparation chambers/baths 24a-24d are aligned in the same plane P. In other words, all these items are located along the same z-axial position, or along the same plane which extends horizontally (i.e., in the x-direction) along the same z-axial position. Having the sample aspiration module body 12, the specimen tubes 18a-18j on the cassette assembly 20, and the preparation chambers/baths 24a-d aligned in the same plane P allows the sample aspiration module body 12 to travel along the traverse 14 in a single longitudinal direction and for the aspiration probe 22 to collect samples from the specimen tubes and deliver the samples to the preparation assembly 24. As shown in FIGS. 2-3, the sampling system 10 includes at least one analytical module 32 configured to analyze the samples. The mechanical system 16 may be coupled with the sampling system 10 using a support 34. Similarly, the preparation chambers/baths 24a-24d may be coupled with the sampling system 10 using a support 36. Specimen tube arrangement 18 and the cassette assembly 20 may be supported on a platform 38.

In use, the cassettes 20a, 20b travel along a sample transport module 30 and then into a mixer 28. In some versions, the cassettes 20a, 20b may travel on a conveyor belt system on which the mixer 28 is mounted. As shown in FIG. 3, mixer 28 may be laterally offset from (e.g., displaced along a z-direction from/inward relative to) transport module 30. The mixer 28 tilts the cassettes to mix the specimens contained within the specimen tubes 18. In some versions, the mixer 28 may tilt the entire cassette away from the line of travel so that a new cassette (e.g., cassette 20a, 20b) may be added to allow the sampling system 10 to mix and clear at the same time. This also allows the sampling system 10 to add an urgent/stat sample to be tested in between a regular sample run. The mixer 28 may mix the specimen tubes 18a-18j.

Figure 4A:
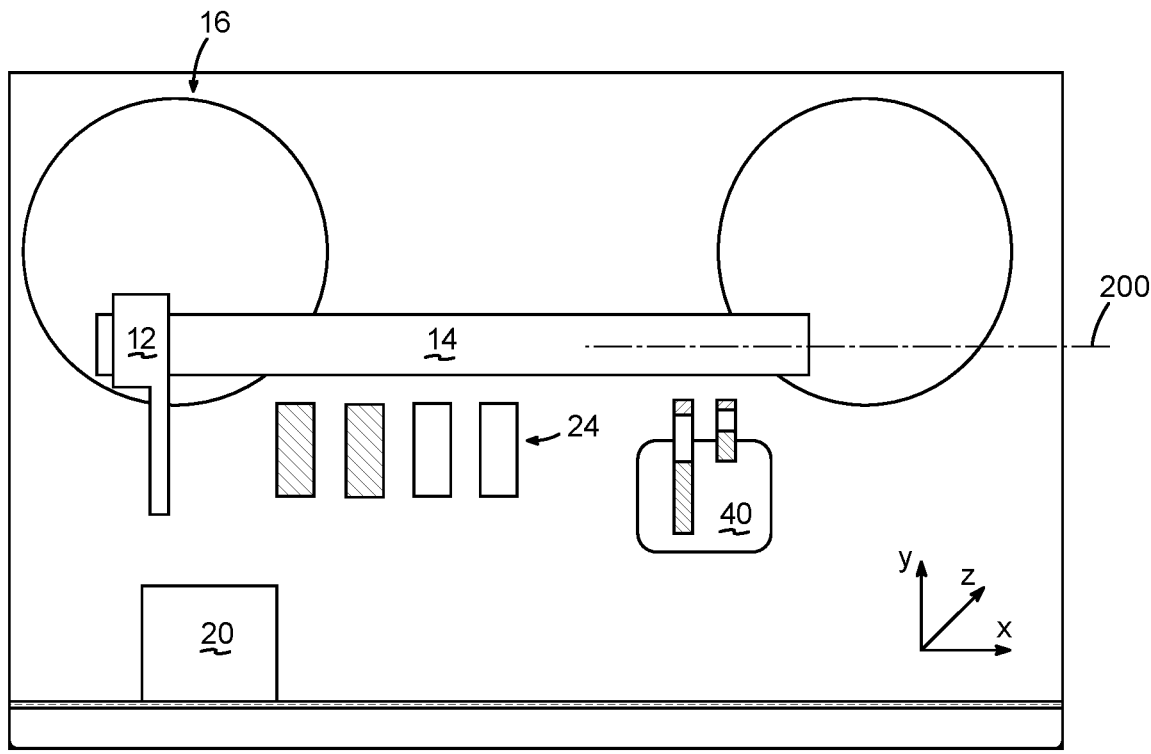
FIG. 4A shows a schematic front plan view of the sampling system of FIG. 1A, but with the traverse locating the sample aspiration module body in the first position.
Figure 4B:
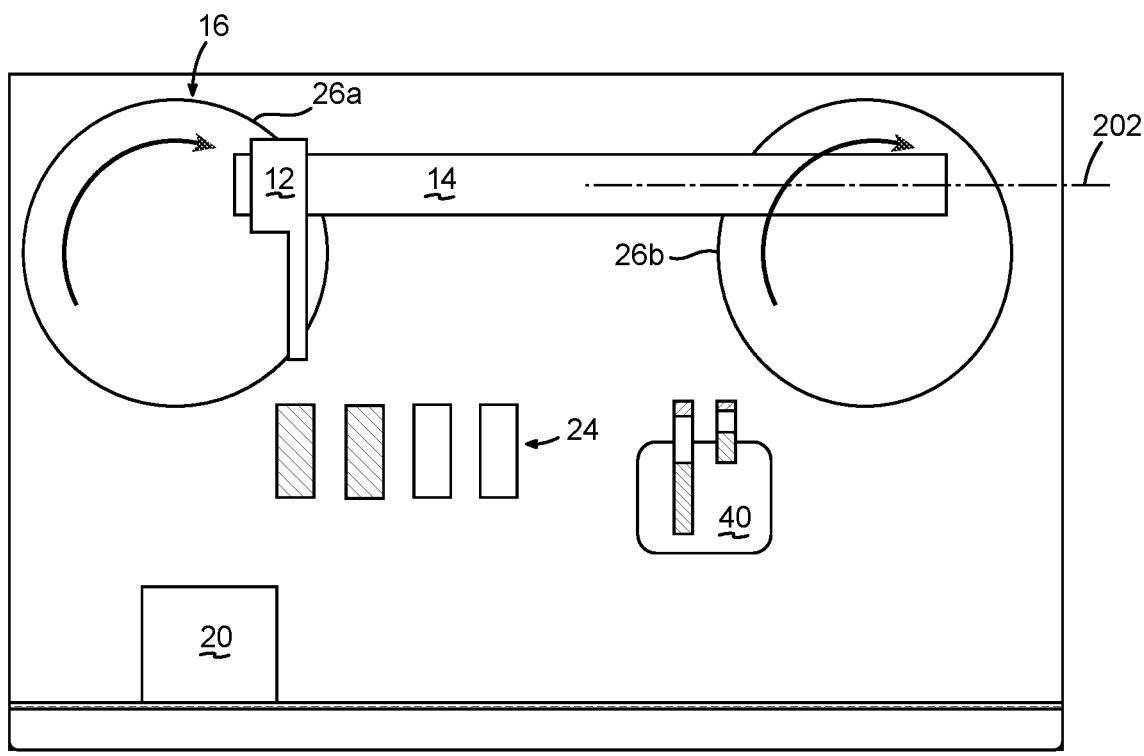
FIG. 4B shows a schematic front plan view of the sampling system of FIG. 4A, but with the mechanical system having moved the traverse to a second position.
Figure 4C:
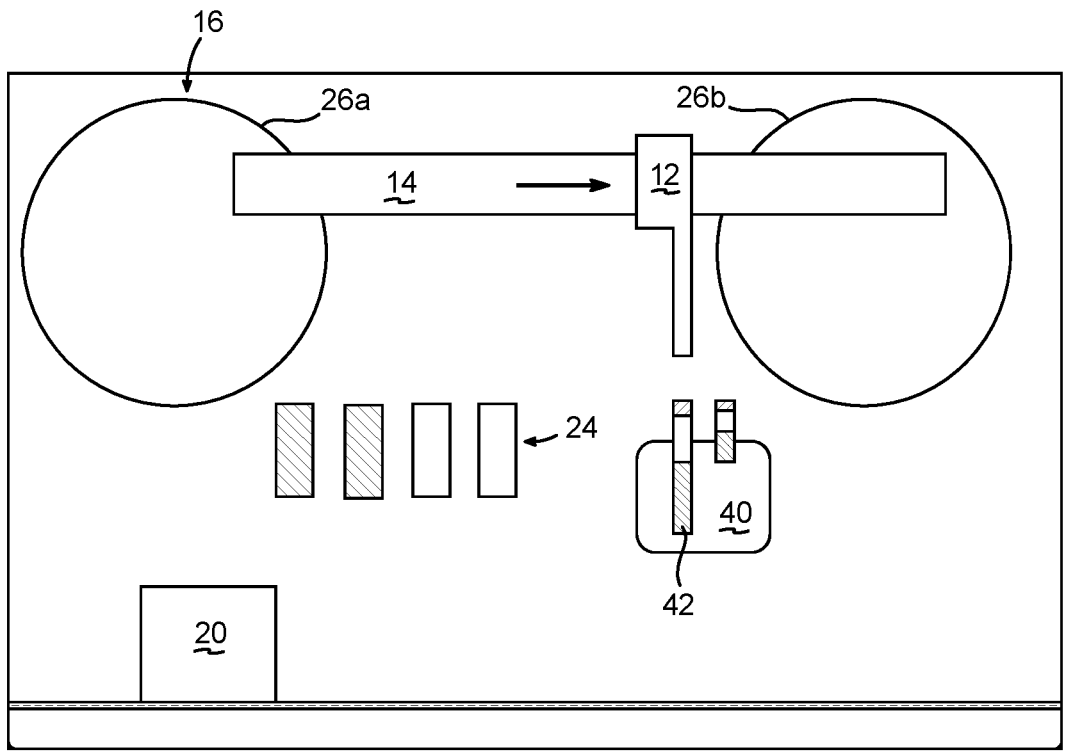
FIG. 4C shows a schematic front plan view of the sampling system of FIG. 4B, but with the sample aspiration module body positioned over a manual sampling position.
Figure 4D:
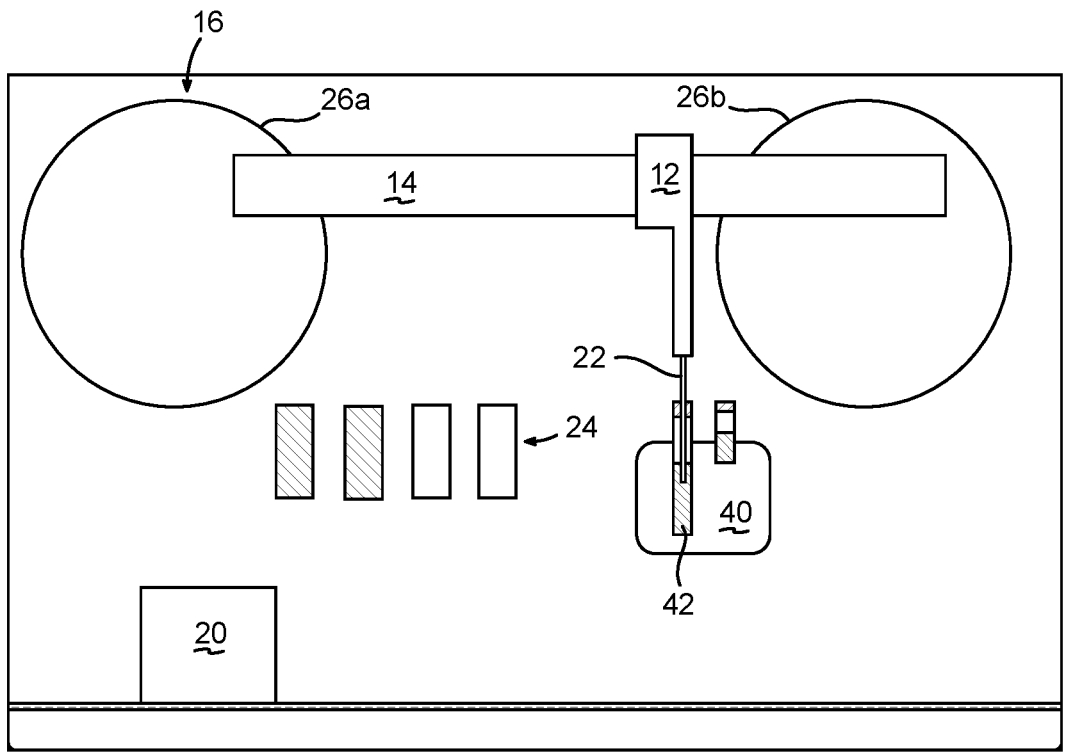
FIG. 4D shows a schematic front plan view of the sampling system of FIG. 4C, but with the probe extended into the manual sampling specimen tube.
Figure 4E:
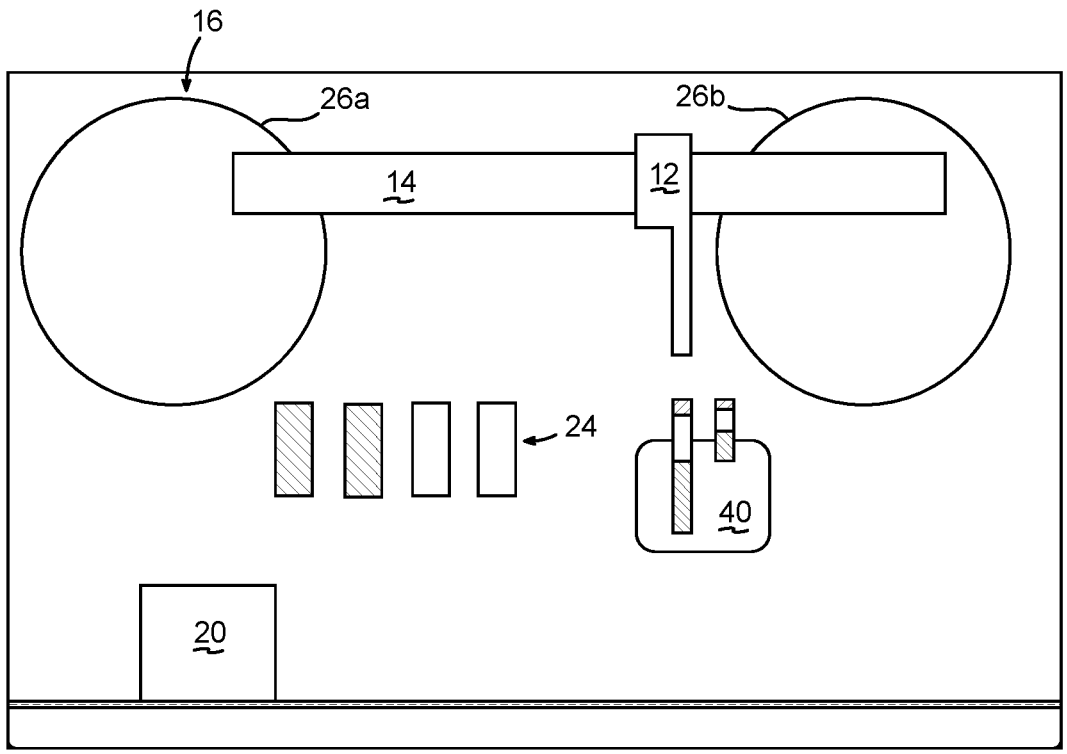
FIG. 4E shows a schematic front plan view of the sampling system of FIG. 4D, but with the probe retracted from the manual sampling specimen tube.
Figure 4F:
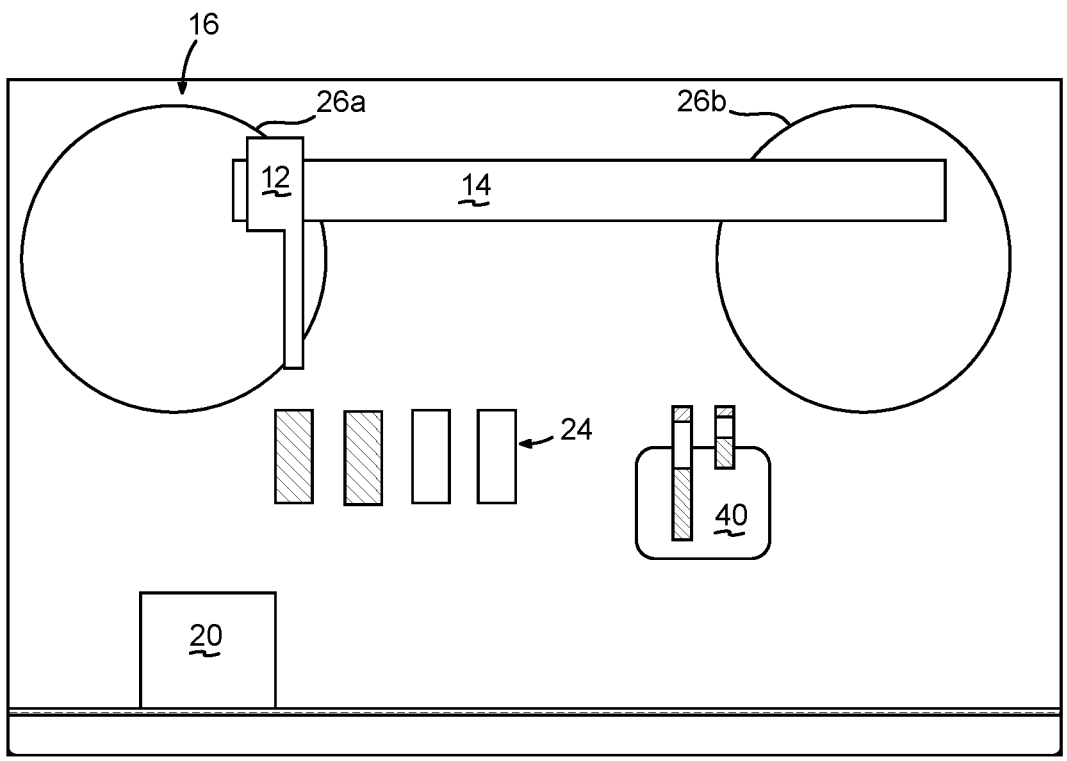
FIG. 4F shows a schematic front plan view of the sampling system of FIG. 4E, but with the sample aspiration module body positioned over a mix chamber.
Figure 4G:
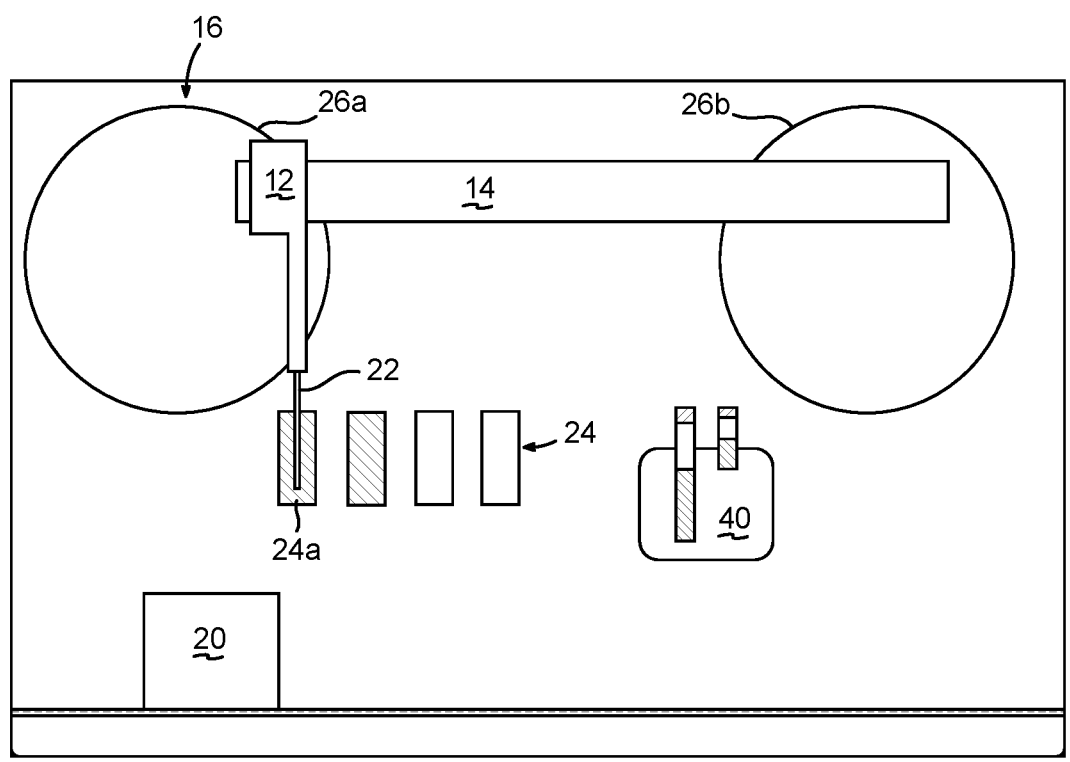
FIG. 4G shows a schematic front plan view of the sampling system of FIG. 4F, but with the probe extended into the mix chamber.

FIGS. 4A-4G illustrates a frontal plan view of sampling system 10 using a manual sampling holder 40 that includes a manually-placed specimen tube 42. The mechanical system 16 moves the sample aspiration module body 12 between a first position 200 (illustrated as a lower position of FIG. 4A) and a second position 202 (illustrated as an upper position of FIG. 4B). In this example, rather than aspirating a sample from a specimen tube 18a-18j on the cassette assembly 20, the sample aspiration module body 12 bypasses the preparation assembly 24 and moves to aspirate a sample from the manually-placed specimen tube 42 on holder 40, shown by FIG. 4D. Once the sample is aspirated as shown by aspiration probe 22 in FIG. 4D, the aspiration probe 22 is retracted (see FIG. 4E), and the sample aspiration module body 12 moves to the preparation chambers/baths 24a-24d (see FIG. 4F). Aliquots of the collected sample may then be deposited into the various chambers/baths 24a-24d of the preparation assembly 24 as outlined above, with FIG. 4G illustrating just the initial aspiration probe 22 extension into the preparation chamber 24a.

Figure 5A:
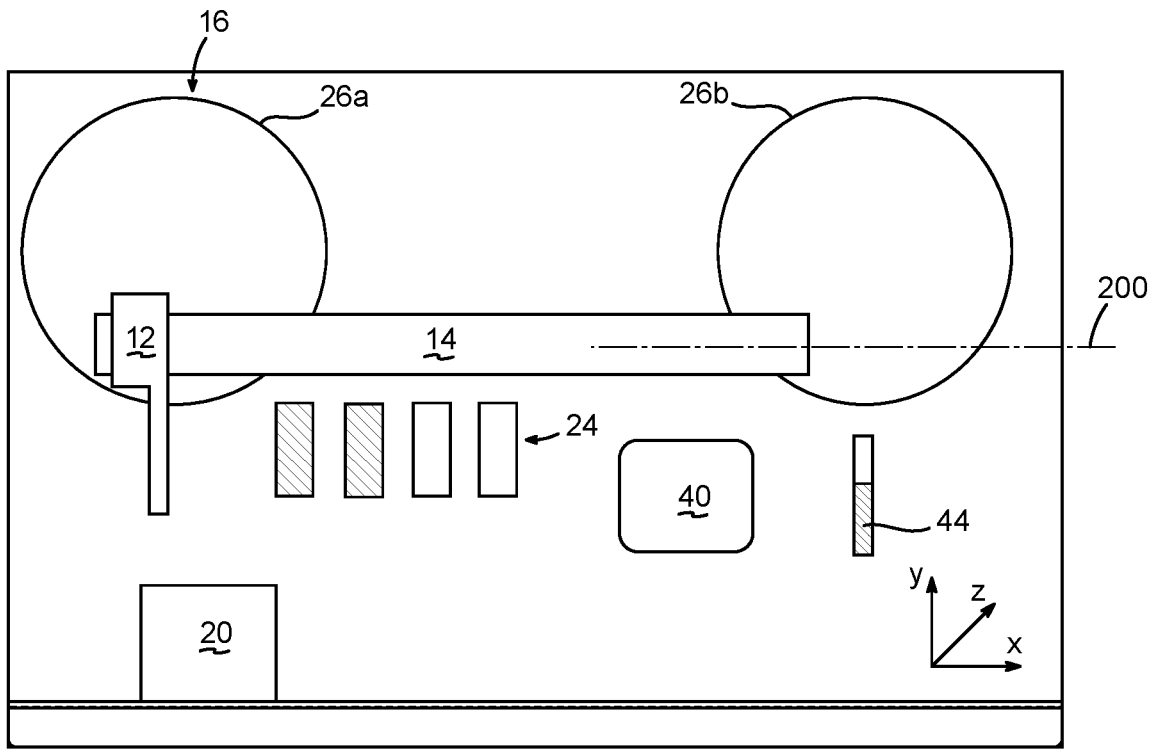
FIG. 5A shows a schematic front plan view of the sampling system of FIG. 1A, but with the traverse locating the sample aspiration module body in the first position.
Figure 5B:
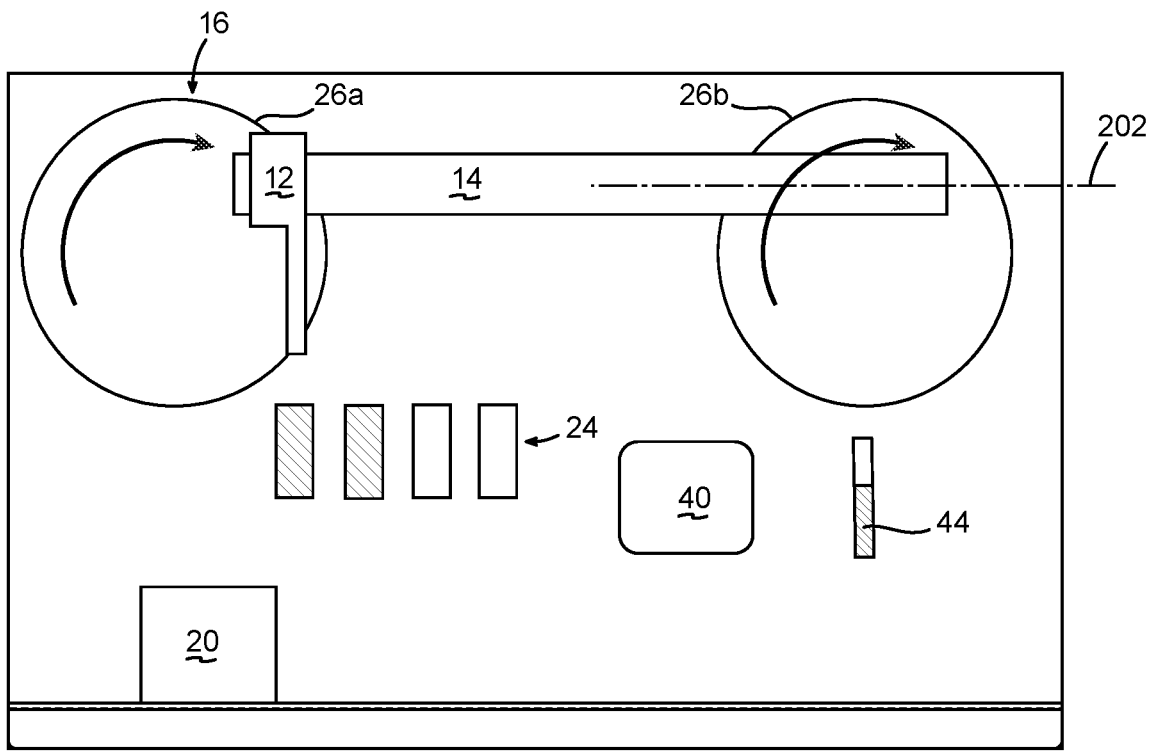
FIG. 5B shows a schematic front plan view of the sampling system of FIG. 5A, but with the mechanical system having moved the traverse to a second position.
Figure 5C:
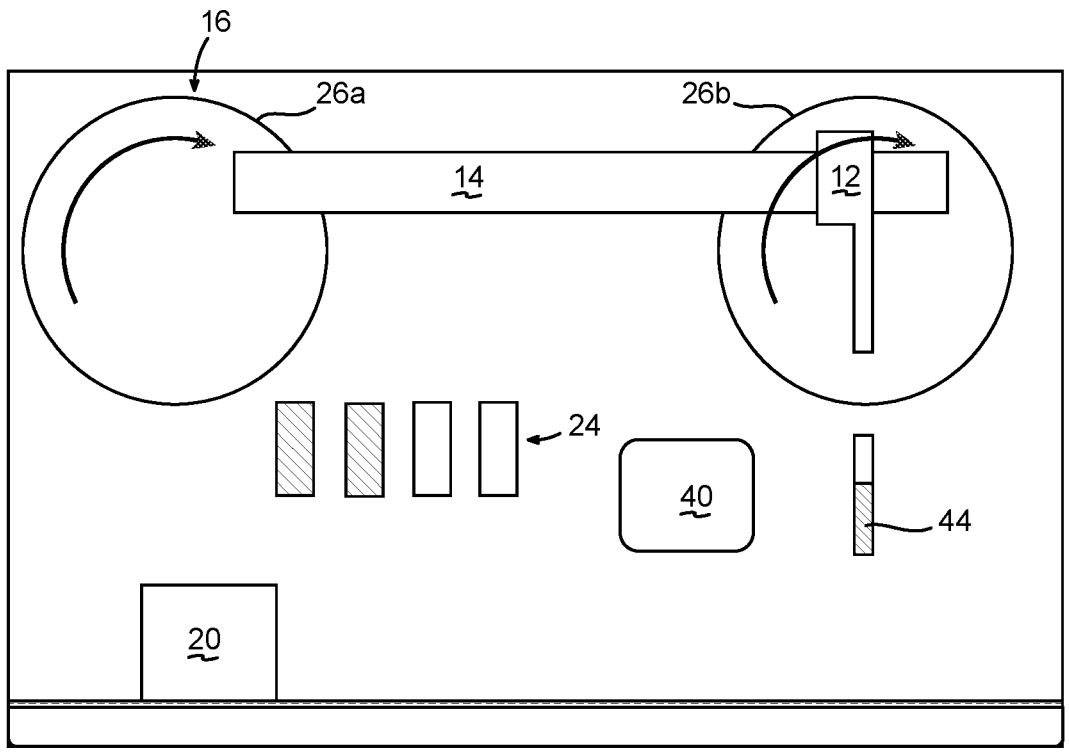
FIG. 5C shows a schematic front plan view of the sampling system of FIG. 5B, but with the sample aspiration module body positioned over an open vial sampling position.
Figure 5D:
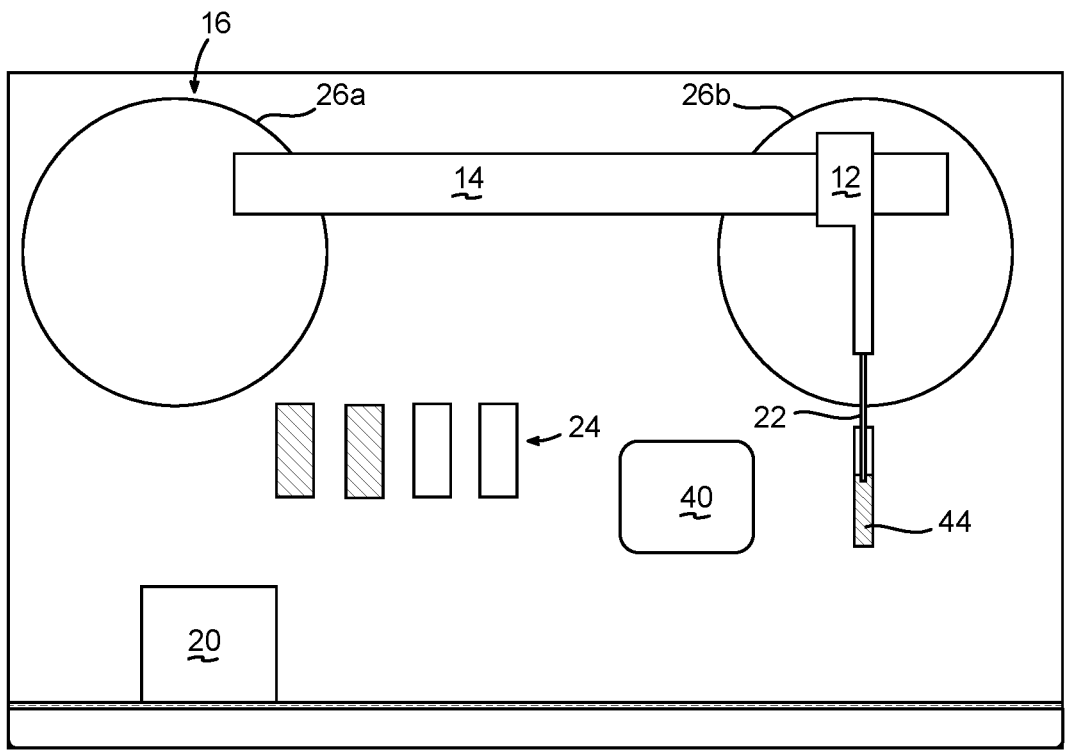
FIG. 5D shows a schematic front plan view of the sampling system of FIG. 5C, but with the probe extended into the open vial.
Figure 5E:
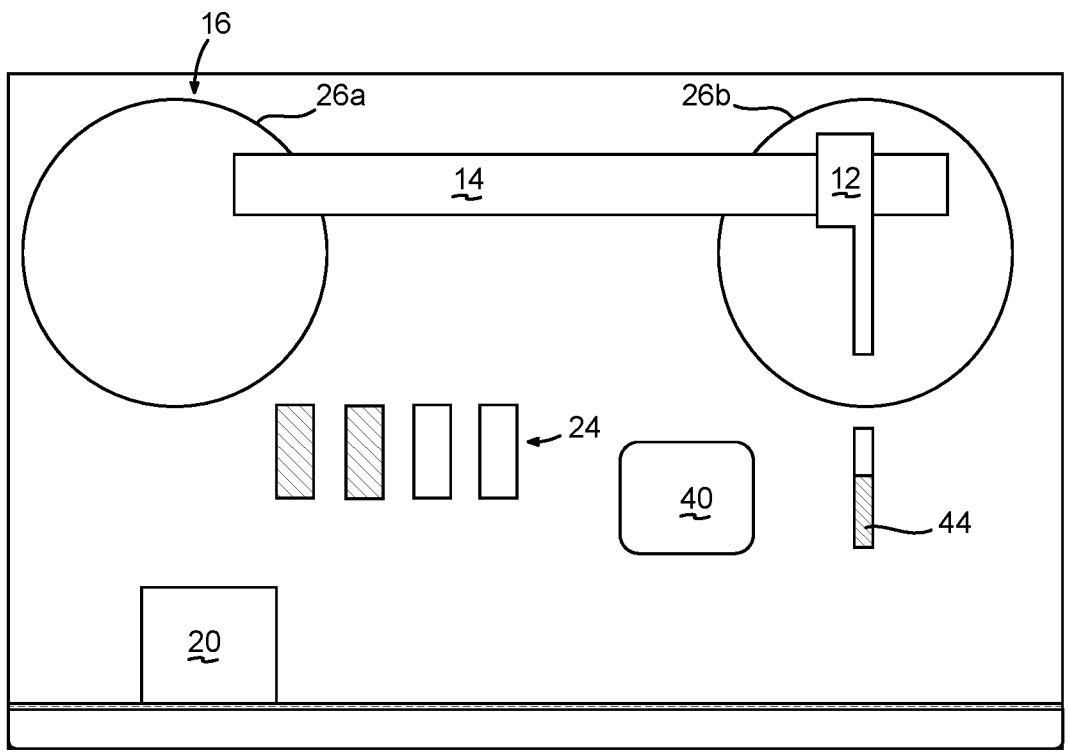
FIG. 5E shows a schematic front plan view of the sampling system of FIG. 5D, but with the probe retracted.
Figure 5F:
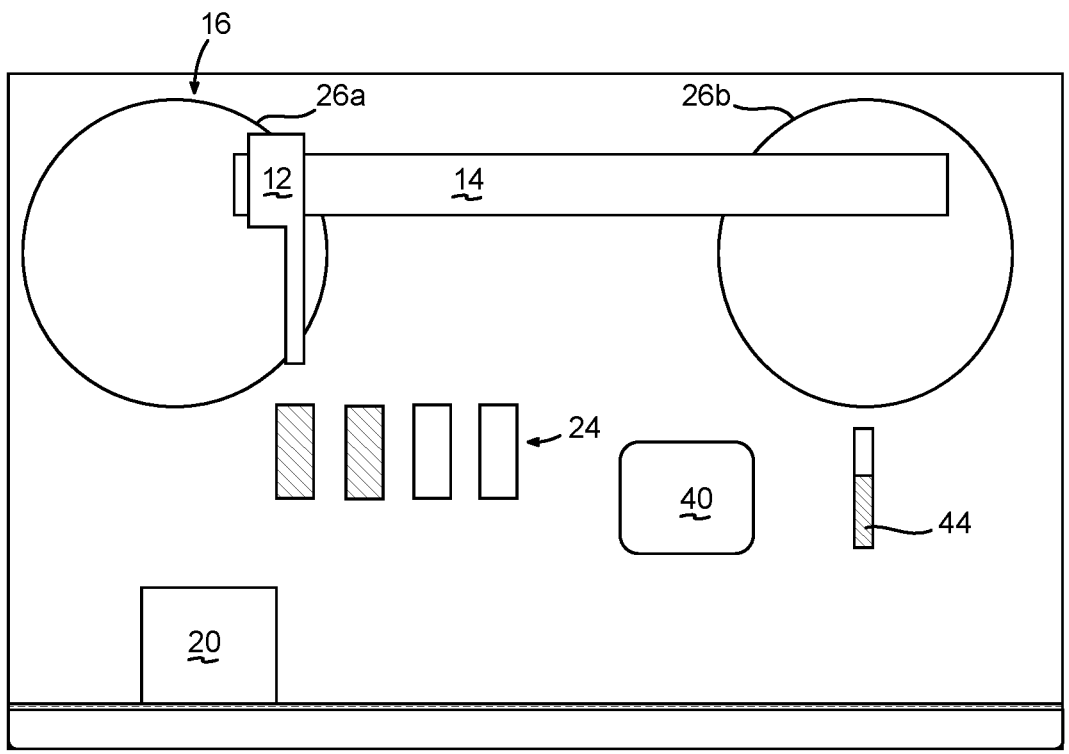
FIG. 5F shows a schematic front plan view of the sampling system of FIG. 5E, but with the sample aspiration module body positioned over a mix chamber.
Figure 5G:
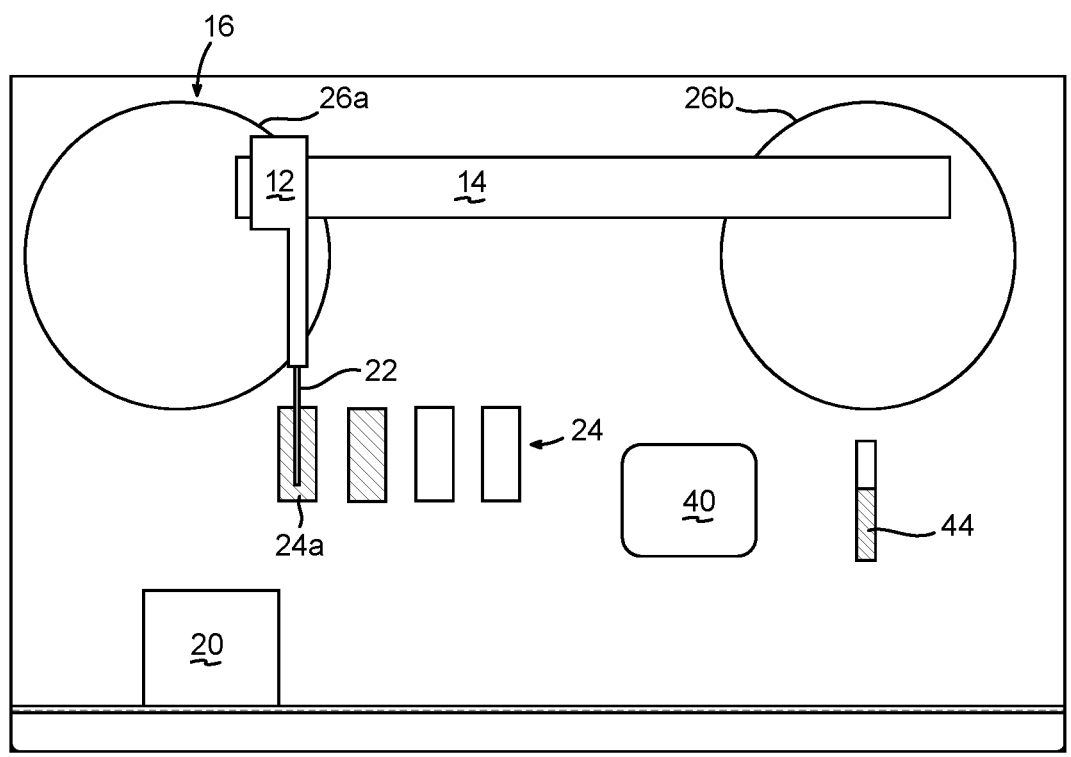
FIG. 5G shows a schematic front plan view of the sampling system of FIG. 5F, but with the probe extended into the mix chamber.

FIGS. 5A-5G illustrate the sampling system 10 using a manual open vial holder 44. For example, the manual open vial holder 44 may be for pediatric testing, where the specimen volume is less than typical, due to smaller patient size. Smaller specimen tubes may also be used. Using the manual open vial holder 44 may allow the user to have direct and free access to the aspiration probe 22 instead of aspirating automatically. As described above, the mechanical system 16 functions similarly to move the sample aspiration module body 12 between a first position 200 (illustrated as a lower position of FIG. 5A) and a second position 202 (illustrated as an upper position of FIG. 5B). The sample aspiration module body 12 may bypass the chambers/baths 24a-24d as well as the manual sampling holder 40 and move to aspirate a sample from a manually-placed specimen tube using holder 44, shown in FIG. 5C. Once the sample is aspirated as shown by aspiration probe 22 in FIG. 5D, the aspiration probe 22 is retracted as shown in FIG. 5E, and the sample aspiration module body 12 is moved to the preparation assembly 24 that includes chambers/baths 24a-24d as shown in FIG. 5F. Aliquots of the collected sample may then be deposited into the various chambers/baths 24a-24d as outlined above, with FIG. 5G illustrating an initial aspiration probe 22 extension into the preparation chamber 24a.

An advantage of the sampling system 10 is that when multiple sample analyzers are desirably connected or when more reaction or preparation chambers 24 are desirably added, current analyzers run out of space due to their configurations. The sampling system allows a possibility to add additional reaction chambers without requiring a wider system, which can take up too much countertop space. By putting the preparation chambers above the samples, vertical space is used, which reduces the overall breadth (e.g., along a z-direction) of the system.

Note that though FIGS. 1A-5G generally show a cam system used to control the position of traverse 14, various alternative embodiments can utilize different approaches. For instance, traverse 14 can be in connection with an angled channel (e.g., where the angled channel angles upward from left to right). One or more rods are connected to one or more locations along traverse 14, the one or more rods are positioned within the angled channel, and the one or more rods are connected to a motor to move along the angled channel to control the position of traverse 14.

Another exemplary sampling system 48 is shown with reference to FIGS. 6A-6D. Unlike traverse 14 of sampling system 10, sampling system 48 includes an angled traverse 50. Using angled traverse 50 in place of the mechanical system 16 may reduce the number of working parts and any accompanying maintenance. The angled traverse 50 supports and guides movement of sample aspiration module body 12, similar to the movement described above. However, in this embodiment, the body 12 moves in an upward direction, along the angled traverse 50. Similar to sampling system 10, sampling system 210 includes a sample transport module 30 with cassettes 20a, 20b. However, the preparation assembly 24 of sampling system 210 is positioned at an upward angle, similar to or otherwise tracking the angled traverse 50. Accordingly, as the body 12 moves up the traverse 50, the aspiration probe 22 also moves up the traverse 50. For the aspiration probe 22 to reach the preparation chambers/baths 24a-24d, the preparation chambers/baths 24a-24d are similarly positioned (i.e., along a similar z-axial position) at upwardly angled positions which may be the same or different than the angle of angled traverse 50. For example, the preparation chambers/bath 24a-24d may resemble a stairstep or an upwardly staggered configuration.

Figure 6A:
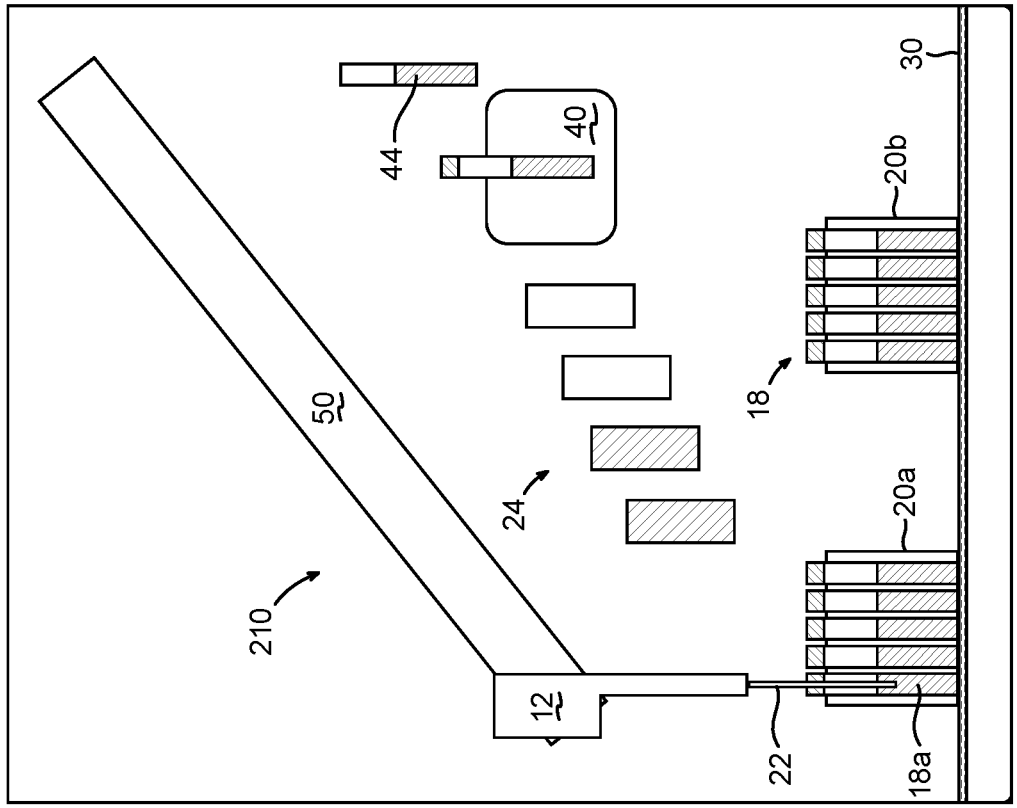
FIG. 6A shows a schematic front plan view of an exemplary sampling system that includes an angled traverse, with the sample aspiration module body positioned over a first specimen tube.
Figure 6B:
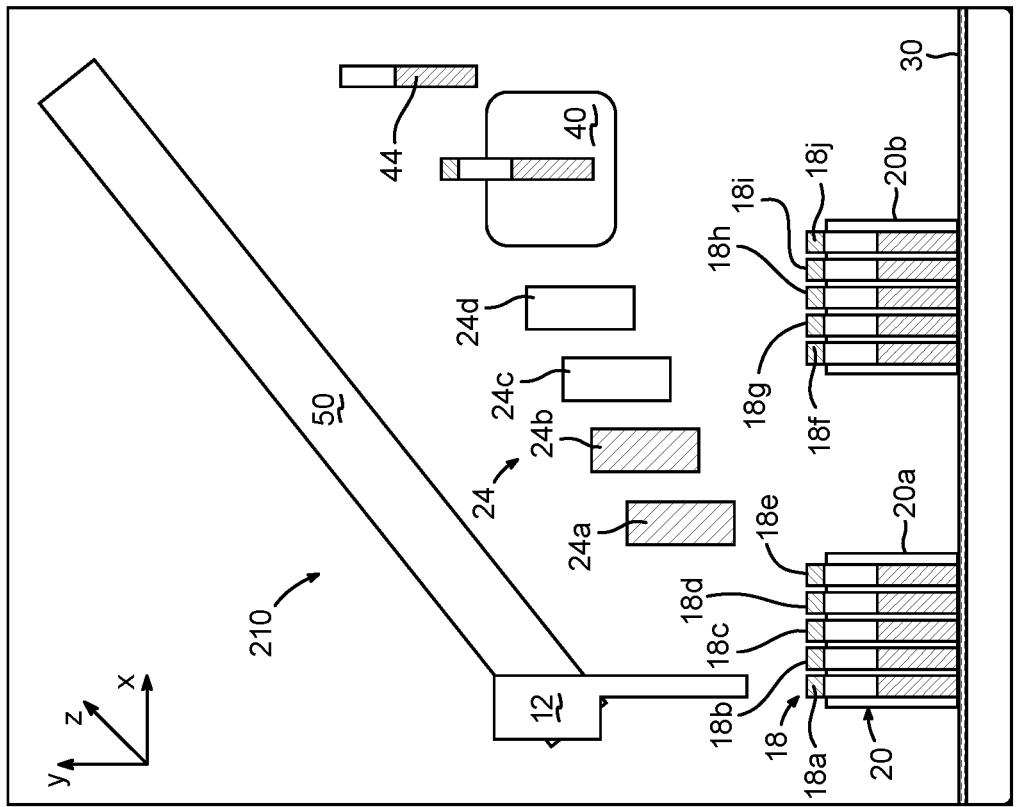
FIG. 6B shows a schematic front plan view of the sampling system of FIG. 6A, but with the probe of the sample aspiration module body extended into the first specimen tube to collect a sample.
Figure 6D:
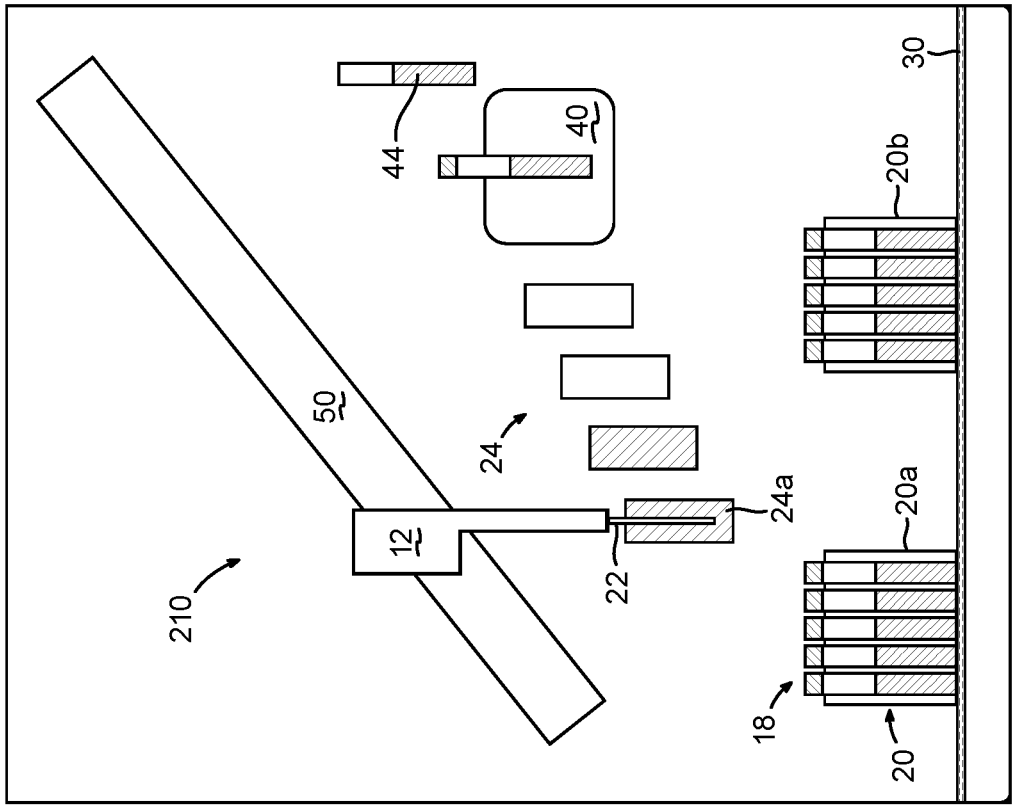
FIG. 6D shows a schematic front plan view of the sampling system of FIG. 6C, but with the probe of the sample aspiration module body extended into first mix chamber to deliver a sample.
Figure 6C:
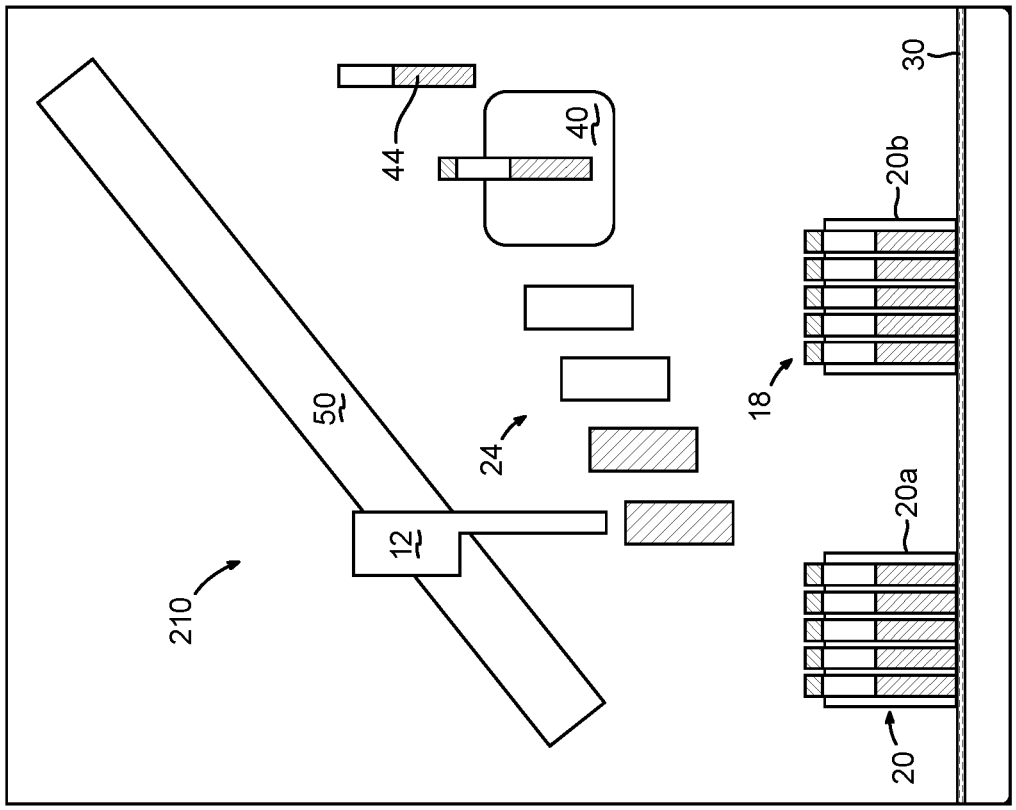
FIG. 6C shows a schematic front plan view of the sampling system of FIG. 6B, but with the sample aspiration module body moved up the angle traverse and positioned over a first mix chamber.

As shown by FIG. 6A, the sample aspiration module body 12 is positioned over a first specimen tube 18a of specimen tube arrangement 18. FIG. 6B illustrates the aspiration probe 22 collecting a sample. The aspiration probe 22 may include a longer needle to access the tube arrangement 18. Once the sample has been collected and the aspiration probe 22 has been retracted, the sample aspiration module body 12 moves up the angled traverse 50. Once sample aspiration module body 12 reaches the position illustrated by FIG. 6C, the aspiration probe 22 extends into the first preparation chamber 24a, as shown by FIG. 6D. The process may proceed as described above and continue in a similar manner for additional samples. After the final sample has been deposited in bath 24d, the sample aspiration module body 12 moves back down the angled traverse 50 to collect a sample from the second specimen tube 18b. This process may continue in a similar manner for the third, fourth, and fifth specimen tube 18c-18e, and so forth with specimen tubes 18f-18j. FIGS. 6A-6D show a manual sampling option (using a manual sampling holder 40) and an open vial manual option (using a holder 44), which may be accessed similarly to the process outlined above.

Alternatively, aspiration probe 22 is not retractable and instead may be elongated to reach the preparation assembly 24. In one example, sample aspiration module body 12 moves independently along a y-direction (i.e., vertically) relative to angled traverse 50. In another example, aspiration module body 12 is fixed along a y-direction (i.e., vertically) relative to angled traverse 50 but angled traverse 50 can tilt to control the position of aspiration probe 22.

It should be understood that various different features described herein may be used interchangeably with various embodiments. For example, if one feature is described with respect to particular example, it is understood that that same feature may be used with other examples as well.

Although certain embodiments have been shown and described, it should be understood that changes and modifications, additions and deletions may be made to the structures and methods recited above and shown in the drawings without departing from the scope or spirit of the disclosure or the following claims.

What is claimed is:

1. A blood analyzer sampling system comprising:
    a plurality of specimen tubes;
    a traverse;
    an aspirator configured to aspirate a sample from a specimen tube from the plurality of specimen tubes, travel along the traverse, and deposit the sample into at least one preparation chamber for processing of the sample;
    wherein the plurality of specimen tubes each have bases which are vertically offset from a base of the at least one preparation chamber and are along a same plane, which plane includes the aspirator, the plurality of specimen tubes and the at least one preparation chamber; and
    wherein vertically offset means offset in a direction of gravitational acceleration toward earth's center.

2. The sampling system of claim 1, further comprising a cassette containing the plurality of specimen tubes and a mixer configured to receive the cassette and mix the plurality of specimen tubes.

3. The sampling system of claim 1, wherein the at least one preparation chamber is positioned above the plurality of specimen tubes.

4. The sampling system of claim 1, wherein the traverse, the aspirator, the plurality of specimen tubes, and the at least one preparation chamber all lie in a sample plane.

5. The sampling system of claim 1, further comprising a sample transporter configured to move the plurality of specimen tubes, and a mixer, wherein the mixer is configured to mix the plurality of specimen tubes out of a line of travel of the sample transporter.

6. The sampling system of claim 1, wherein aspirator comprises an aspiration probe which is both extendable and retractable.

7. The sampling system of claim 1, wherein;
    the aspirator is operable in connection with the traverse to gather the sample from a specimen tube of the plurality of specimen tubes at a first position, and to deposit the sample into a preparation chamber from the at least one preparation chamber at a second position; and
    both the first position and the second position lie in the same plane.

8. The sampling system of claim 1, wherein:
    the aspirator is operable in connection with the traverse to gather the sample from a specimen tube of the plurality of specimen tubes at a first position, and to deposit the sample into a preparation chamber from the at least one preparation chamber at a second position; and
    the first position has a different horizontal and vertical location than the second position.

9. The sampling system of claim 1, wherein the at least one sample preparation chamber comprises two or more sample preparation chambers, each in a vertically staggered configuration.

10. A blood analyzer sampling system comprising:
    a plurality of specimen tubes;
    a traverse;
    an aspirator in operable connection with the traverse;
    the traverse configured to move from a first position where the aspirator is configured to gather a sample from a specimen tube from the plurality of specimen tubes to a second position where the aspirator is configured to deposit the sample into a preparation tube for processing of the sample;
    wherein the plurality of specimen tubes each have bases which are vertically offset from a base of the preparation chamber and are along a sample plane, which plane includes the aspirator, the plurality of specimen tubes, and the preparation chamber; and
    wherein vertically offset means offset in a direction of gravitational acceleration toward earth's center.

11. The sampling system of claim 10, wherein the traverse is connected to two cams which are configured to move the traverse from the first position to the second position.

12. The sampling system of claim 10, further comprising a cassette containing the plurality of specimen tubes and a mixer configured to receive the cassette and mix the plurality of specimen tubes.

13. The sampling system of claim 10, wherein the first position has a different horizontal and vertical location than the second position.

14. The sampling system of claim 10, further comprising a sample transporter configured to move the plurality of specimen tubes, and a mixer, wherein the mixer is configured to mix the plurality of specimen tubes out of a line of travel of the sample transporter.

15. A hematology sampling system comprising:
    a plurality of specimen tubes and a plurality of preparation chambers;
    an aspirator configured collect a sample from one of the plurality of specimen tubes at a first position and deposit the sample in at least one of the plurality of preparation chambers at a second position;
    wherein the plurality of specimen tubes each have bases which are vertically offset from a base of the at least one preparation chamber and are along a same plane which includes the plurality of specimen tubes, the aspirator and the at least one preparation chamber; and
    wherein vertically offset means offset in a direction of gravitational acceleration toward earth's center.

16. The sampling system of claim 15, further comprising a traverse in operable connection with the aspirator.

17. The sampling system of claim 16, wherein the aspirator is configured to travel along a traverse between the first position and the second position.

18. The sampling system of claim 16, wherein the traverse is configured to move to position the aspirator at the first position and at the second position.

19. The sampling system of claim 15, wherein the aspirator comprises an aspiration probe which is both extendable and retractable.

20. The sampling system of claim 15, wherein the plurality of preparation chambers are in a vertically staggered configuration.

* * * * *